US012636652B2

(12) United States Patent
Addihalli Narayana et al.

(10) Patent No.: US 12,636,652 B2
(45) Date of Patent: May 26, 2026

(54) LABORATORY SAMPLE CONTAINER CARRIER HANDLING APPARATUS AND LABORATORY SAMPLE DISTRIBUTION SYSTEM

(71) Applicant: Roche Diagnostics Operations, Inc., Indianapolis, IN (US)

(72) Inventors: Avinash Addihalli Narayana, Stuttgart (DE); Tobias Huber, Backnang (DE)

(73) Assignee: Roche Diagnostics Operations, Inc., Indianapolis, IN (US)

( * ) Notice: Subject to any disclaimer, the term of this patent is extended or adjusted under 35 U.S.C. 154(b) by 778 days.

(21) Appl. No.: 17/660,763

(22) Filed: Apr. 26, 2022

(65) Prior Publication Data

US 2022/0371020 A1 Nov. 24, 2022

(30) Foreign Application Priority Data

May 18, 2021 (EP) ..................................... 21174525

(51) Int. Cl.
 B01L 9/06 (2006.01)
 *G01N 35/02* (2006.01)
 *G01N 35/04* (2006.01)

(52) U.S. Cl.
 CPC ........... B01L 9/06 (2013.01); *B01L 2200/023* (2013.01); *B01L 2200/025* (2013.01); *G01N 35/025* (2013.01); *G01N 2035/0439* (2013.01); *G01N 2035/0465* (2013.01)

(58) Field of Classification Search
 CPC ................. B01L 9/06; B01L 2200/023; B01L 2200/025; G01N 2035/0439; G01N 2035/0465; G01N 35/04; B65G 29/00; B65G 47/22; B65G 47/90; B65G 2201/0235
See application file for complete search history.

(56) References Cited

U.S. PATENT DOCUMENTS

| | | | | |
|---|---|---|---|---|
| 5,969,813 | A * | 10/1999 | Hammond | ........... G01N 21/253 |
| | | | | 356/326 |
| 2018/0156835 | A1* | 6/2018 | Hassan | .............. G01N 35/1081 |
| 2018/0321268 | A1 | 11/2018 | Schacher et al. | |
| 2021/0215730 | A1* | 7/2021 | Yamaguchi | ........ G01N 35/0095 |

FOREIGN PATENT DOCUMENTS

| | | | |
|---|---|---|---|
| EP | 2908139 A2 | 8/2015 | |
| EP | 3456415 A1 * | 3/2019 | ............... B01L 9/06 |
| EP | 2773968 B1 | 3/2020 | |
| WO | WO-2019235172 A1 * | 12/2019 | ......... G01N 35/0095 |

OTHER PUBLICATIONS

European Search Report issued Nov. 4, 2021, in Application No. 21174525.2, 2 pp.

* cited by examiner

*Primary Examiner* — Maris R Kessel
*Assistant Examiner* — May Leung Chiu
(74) *Attorney, Agent, or Firm* — Thomas E. Lees, LLC

(57) ABSTRACT

The present disclosure relates to a laboratory sample container carrier handling apparatus comprising a revolving device, being adapted to move a sample container carrier supplied to the revolving device along a circular path P, and wherein the circular path P has at least one ascending ramp. The present disclosure relates further to a laboratory sample distribution system comprising such a laboratory sample container carrier handling apparatus.

11 Claims, 3 Drawing Sheets

LABORATORY SAMPLE CONTAINER CARRIER HANDLING APPARATUS AND LABORATORY SAMPLE DISTRIBUTION SYSTEM

CROSS-REFERENCE TO RELATED APPLICATIONS

This application claims priority to European Patent Application No. 21174525.2, filed 18 May 2021, the disclosure of which is hereby incorporated by reference in its entirety.

TECHNICAL FIELD

The present disclosure relates to a laboratory sample container carrier handling apparatus and to a laboratory sample distribution system.

SUMMARY

Although the embodiments of the present disclosure are not limited to specific advantages or functionality, it is noted that in accordance with the present disclosure a laboratory sample container carrier handling apparatus and a laboratory sample distribution system are presented that that increases reliability.

In accordance with one embodiment, a laboratory sample container carrier handling apparatus is provided and is adapted to be coupled to a transport plane, comprising: a revolving device, being adapted to move a sample container carrier supplied to the revolving device along a segment of a circular path, and a driving surface, wherein the revolving device is adapted to push the sample container carrier supplied to the revolving device on top of the driving surface along the segment from an entry position to an exit position, wherein the driving surface has at least one ascending ramp along the segment from the entry position to the exit position.

In accordance with another embodiment, a laboratory sample distribution system is provided, wherein the laboratory sample distribution system comprises: a number of sample container carriers, wherein the sample container carriers are adapted to carry one or more sample containers, wherein the sample containers comprise samples to be analyzed, a transport plane, wherein the transport plane is adapted to support the sample container carriers, drive means, wherein the drive means are adapted to move the sample container carriers on top of the transport plane, and a laboratory sample container carrier handling apparatus according to another embodiment of the instant disclosure.

These and other features and advantages of the embodiments of the present disclosure will be more fully understood from the following detailed description taken together with the accompanying claims. It is noted that the scope of the claims is defined by the recitations therein and not by the specific discussions of features and advantages set forth in the present description.

BRIEF DESCRIPTION OF THE DRAWINGS

The following detailed description of the embodiments of the present description can be best understood when read in conjunction with the following drawings, where like structure is indicated with like reference numerals and in which.

Figure 1:
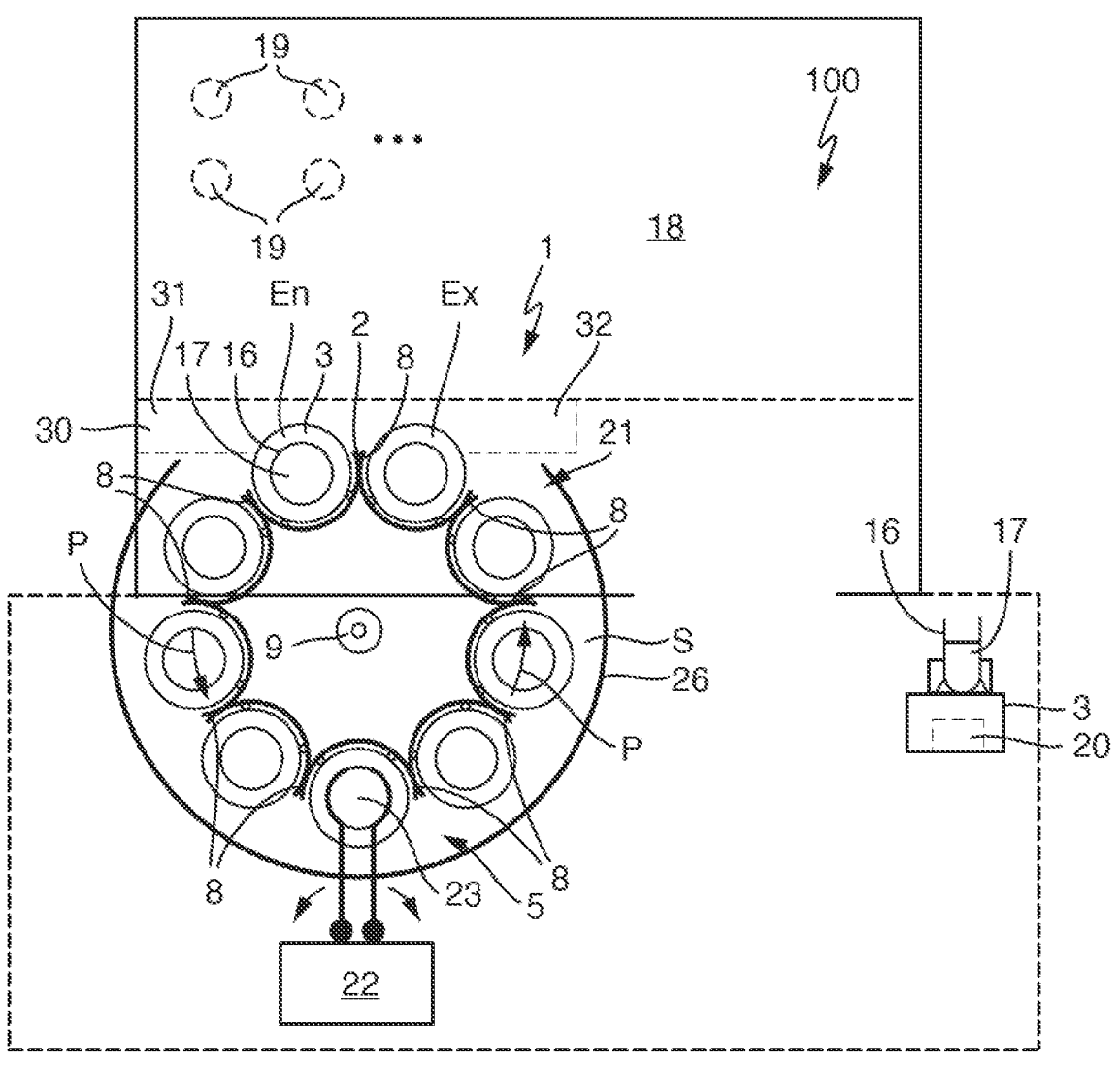
FIG. 1 schematically depicts a top view on a laboratory sample distribution system comprising a laboratory sample container carrier handling apparatus.

Skilled artisans appreciate that elements in the figures are illustrated for simplicity and clarity and have not been drawn to scale. For example, dimensions of some of the elements in the figures may be exaggerated relative to other elements to help improve understanding of the embodiment(s) of the present disclosure.

DETAILED DESCRIPTION

The present disclosure relates to a laboratory sample container carrier handling apparatus. It is adapted to be coupled to a transport plane, especially a transport plane of a laboratory sample distribution system.

The laboratory sample container carrier handling apparatus comprises a revolving device, being adapted to move a sample container carrier supplied to the revolving device along a segment of a circular path. It comprises a driving surface, wherein the revolving device is adapted to push the sample container carrier supplied to the revolving device on top of the driving surface along the segment from an entry position to an exit position. The driving surface has at least one ascending ramp along the segment from the entry position to the exit position.

By means of the inventive laboratory sample container carrier handling apparatus, the ascending ramp can be used in order to provide for a lifting of the sample container carrier moving along the driving surface, which may lead to a better adaptation to a transport plane without the risk of tilting the sample container carrier entering or leaving the sample container carrier handling apparatus. In other words, it can be avoided that the sample container carrier is moved into an upwards step between the transport plane and the driving surface such that the risk of spillage can be significantly reduced.

The transport plane may be a plane being positioned adjacent to the laboratory sample container carrier handling apparatus. It may be a plane of a laboratory sample distribution system. For the purpose of the laboratory sample container carrier handling apparatus, the transport plane may be regarded as a reference height level.

The entry position may be a position at which a sample container carrier can be received from the transport plane. The exit position may be a position at which a sample container carrier may be transferred to the transport plane. The driving surface may start, at the entry position, at a height below the transport plane. Furthermore, the driving surface may end, at the exit position, at a height above the transport plane. Thus, the sample container carrier strictly moves downward when passing an interface from or to the transport plane, so that an impact of the sample container carrier, tilting of the sample container carrier and spilling can be prevented.

According to an embodiment, the driving surface has, along the segment from the entry position to the exit position, no upward step. This can help to prevent tilting of the sample container carrier when moving along the driving surface.

According to an embodiment, the driving surface has a first horizontal part immediately adjacent to the entry position. This may help to correctly align a sample container carrier obtained from the transport plane.

According to an embodiment, the driving surface may have a second horizontal part immediately adjacent to the exit position. This may also help to correctly align a sample container carrier before being released to the transport plane.

According to an embodiment, the driving surface has a third horizontal part defining a or at a handover position. This handover position may be used to insert a sample container into a sample container carrier from an external device, or to release a sample container from a sample container carrier to be processed independently from the laboratory sample container carrier handling apparatus.

The driving surface may have further horizontal parts at positions where a dedicated activity takes place, e.g., at a pick station, at an entry, at a camera, at a handover, at an exit, etc.

According to an embodiment, the driving surface has a first ascending ramp along the segment from the entry position to the handover position.

According to an embodiment, the driving surface has a second ascending ramp along the segment from the handover position to the exit position. Such ascending ramps may allow for having the handover position at the same or at least approximately the same height as the transport plane. The ascending ramps may, e.g., have a gradient between 0.1 degrees and 2 degrees.

According to an embodiment, the revolving device comprises a number (e.g., between 5 and 20) of pushing cavities being adapted to receive a sample container carrier to be rotated and being adapted to push a sample container carrier being received along the segment. Thus, each sample container carrier may have its own cavity in order to be moved along the driving surface.

According to an embodiment, a respective pushing cavity comprises two side walls, wherein the side walls rotate around an axis of rotation of the revolving device, wherein a side wall pushes a sample container carrier being in contact with the side wall along the segment.

According to an embodiment, the side walls contact each other along the axis of rotation of the revolving device. This may be regarded with respect to actually visible side walls, or also with respect to lines that may be used in order to define dimensions of the cavities.

The present disclosure relates further to a laboratory sample distribution system. The laboratory sample distribution system comprises a number of sample container carriers, wherein the sample container carriers are adapted to carry one or more sample containers, wherein the sample containers comprise samples to be analyzed. The laboratory sample distribution system comprises a transport plane, wherein the transport plane is adapted to support the sample container carriers. The laboratory sample distribution system comprises drive means, wherein the drive means are adapted to move the sample container carriers on top of the transport plane. The laboratory sample distribution system further comprises a laboratory sample container carrier handling apparatus according to the present disclosure. All disclosed embodiments and variations can be applied.

By means of the inventive laboratory sample distribution system, the laboratory sample container carrier handling apparatus can be applied, for example in order to provide a defined handover position without the risk of tilting the sample containers or sample container carriers.

The laboratory sample distribution system may comprise a number of sample container carriers, wherein the sample container carriers are adapted to carry one or more sample containers, wherein the sample containers comprise samples to be analyzed, e.g., samples of body fluids, in particular blood samples. The sample container carrier may, e.g., be embodied as disclosed in EP 2 908 139 A2 or EP 3 456 415

A1, the disclosures of which are hereby incorporated by reference, or similar to those sample container carriers. The sample containers are typically embodied as conventional laboratory sample tubes. Reference is insofar made to the relevant technical literature.

The transport plane and the drive means may, e.g., be embodied as disclosed in EP 2 773 968 B1, the disclosure of which is hereby incorporated by reference.

According to an embodiment, the transport plane is arranged directly adjacent to the driving surface, wherein the drive means are adapted to supply sample container carriers to the revolving device and/or are adapted to receive sample container carriers from the revolving device. This may allow an efficient exchange of sample container carriers between the transport plane and the revolving device.

According to an embodiment, a seal is provided laterally between the transport plane and the driving surface. The seal may, for example, prevent fluids from flowing through a path between the transport plane and the driving surface.

The seal may have an entry surface positioned between the transport plane and the entry position, the entry surface having a height between the height of the transport plane and the height of the driving surface at the entry position. The seal may also have an exit surface positioned between the transport plane and the exit position, the exit surface having a height between the height of the transport plane and the height of the driving surface at the exit position. Such an embodiment of a seal may prevent sample containers from being tilted when entering the driving surface from the transport plane and when leaving the driving surface to the transport plane.

According to an embodiment, the sample container carriers comprise at least one magnetically active device, typically at least one permanent magnet. The drive means may comprise a number of electro-magnetic actuators being stationary arranged in rows and columns below the transport plane, the electro-magnetic actuators being adapted to apply a magnetic force to the sample container carriers. This may enable a smooth and flexible driving of the sample container carriers.

According to an embodiment, the laboratory sample distribution system further comprises a gripping device being adapted to insert a sample container into a sample container carrier being positioned at a handover position and/or remove a sample container from a sample container carrier being positioned at the handover position, wherein the handover position is located on the segment.

Such a gripping device may release sample containers or may place sample containers in sample container carriers, thus providing for an efficient exchange of sample containers between the laboratory sample distribution system and other entities.

According to an embodiment, the driving surface has, at the entry position, a height below the transport plane. In particular, at the entry position, the driving surface may be in a range between 0.3 mm and 0.5 mm below the transport plane.

According to an embodiment, the driving surface has, at the exit position, a height being above the transport plane. In particular, at the exit position, the driving surface may be in a range between 0.3 mm and 0.5 mm above the transport plane. Such values have been proven suitable for typical applications.

In order that the embodiments of the present disclosure may be more readily understood, reference is made to the following examples, which are intended to illustrate the disclosure, but not limit the scope thereof.

FIG. 1 schematically depicts a top view on a laboratory sample distribution system 100. The laboratory sample distribution system 100 comprises a plurality of sample container carriers 3, wherein the sample container carriers 3 are adapted to carry one sample container 16, wherein the sample containers 16 comprise samples 17 to be analyzed.

The laboratory sample distribution system 100 further comprises a flat transport plane 18, wherein the transport plane 18 is adapted to support the sample container carriers 3. In other words, the sample container carriers 3 are placed on top of the transport plane 18.

The laboratory sample distribution system 100 further comprises drive means 19 in form of electro-magnetic actuators arranged in rows and columns below the transport plane 18, wherein the electro-magnetic actuators 19 are adapted to move the sample container carriers 3 on top of the transport plane 18 by applying a magnetic force to a magnetically active device 20 in form of a permanent magnet arranged in a bottom portion of the sample container carriers 3.

The laboratory sample distribution system 100 further comprises a laboratory sample container carrier handling apparatus 1 being arranged adjacent to the transport plane 18.

The laboratory sample container carrier handling apparatus 1 comprises a revolving device 2 being adapted to move sample container carriers 3 supplied to the revolving device 2 from the transport plane 18 along a circular path P.

The laboratory sample container carrier handling apparatus 1 further comprises a driving surface 5, wherein the revolving device 2 is adapted to push the sample container carriers 3 supplied to the revolving device 2 on top of the driving surface 5 along the circular path P. More specifically, the sample container carriers 3 are moved along a segment S of the path P, wherein typically not the entire circular path P is used for moving the sample container carriers 3.

The sample container carriers 3 are moved from the transport plane 18 onto the driving surface 5 at an entry position En. After having been moved along the circular path P or along the segment S, they are released at an exit position Ex. Between the driving surface 5 and the transport plane 18, a seal 30 is provided which prevents fluid from flowing down at a gap between the transport plane 18 and the driving surface 5.

The seal 30 comprises an entry surface 31 and an exit surface 32, which are located at the left and right portions of the seal 30 according to the orientation of FIG. 1, and which will be described in further detail below.

The revolving device 2 comprises a number of pushing cavities 21 being adapted to receive the sample container carriers 3 to be rotated. A respective pushing cavity 21 comprises two radially extending side walls 8, wherein the side walls 8 rotate around an axis 9 of rotation of the revolving device 2. A side wall 8 pushes a sample container carrier 3 being in contact with the side wall 8 along the circular path P. In total, the revolving device 2 comprises nine pushing cavities 21. The shape of each pushing cavity 21 is semicircular as shown.

The revolving device 2 comprises a fixed cylindrical outer wall 26, wherein the side walls 8 rotate inside the outer wall 26. The cylindrical outer wall 26 radially guides the rotating sample container carriers 3 along the circular path P.

The laboratory sample distribution system 100 further comprises a gripping device 22 being assigned to the revolving device 2. The gripping device 22 is adapted to remove a sample container 16 from a sample container carrier 3 being positioned at a hand-over position 23 located on the circular path P. The removed sample container 16 may, e.g., be transported to any kind of further processing. The gripping device 22 may also be used in order to insert a sample container 16 into an empty sample container carrier 3 being positioned at the hand-over position 23.

Figure 2:
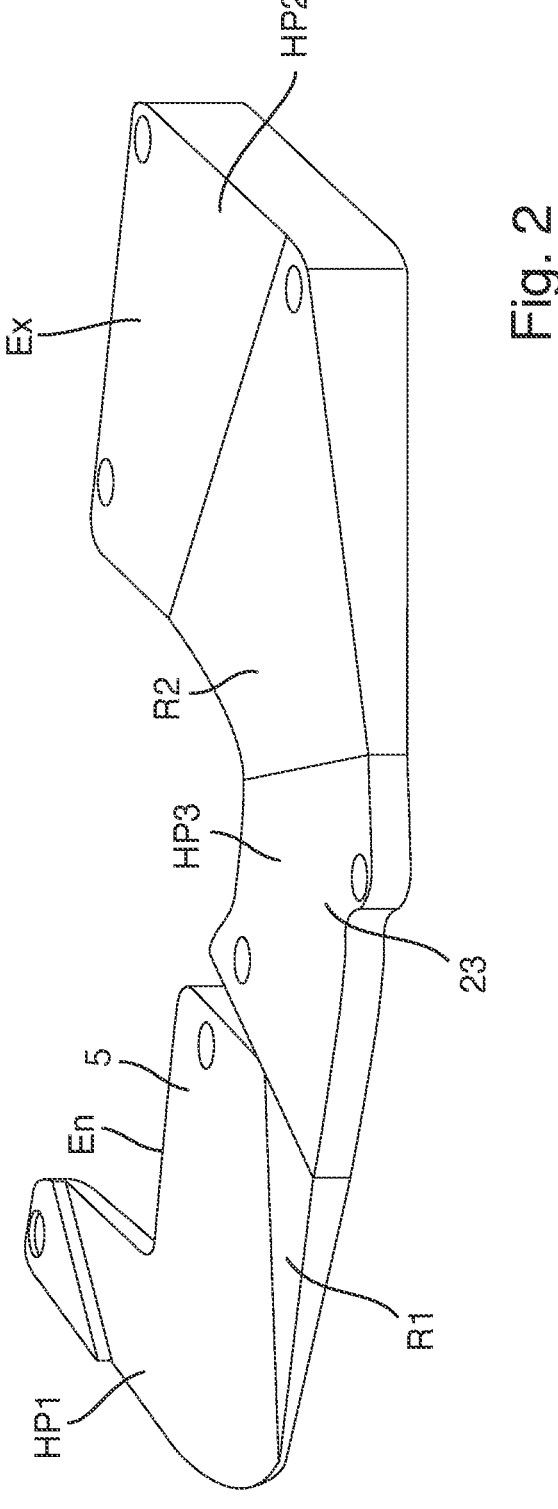
FIG. 2 schematically depicts a driving surface.

FIG. 2 shows in more detail the driving surface 5. At the entry position En, there is a first horizontal part HP1 at which the sample container carriers are received from the transport plane 18. Immediately adjacent to the first horizontal part HP1 there is a first ascending ramp R1, in which the height of the driving surface 5 increases to the hand-over position 23. At the hand-over position 23, there is a third horizontal part HP3. Afterwards, the driving surface 5 has a second ascending ramp R2 towards a second horizontal part HP2 at the exit position Ex. Thus, the driving surface 5 is at each part either horizontal or ascending along the moving direction of the sample container carriers 3. This prevents tilting of the sample container carriers 3 and thus guarantees smooth operation.

Figure 3:
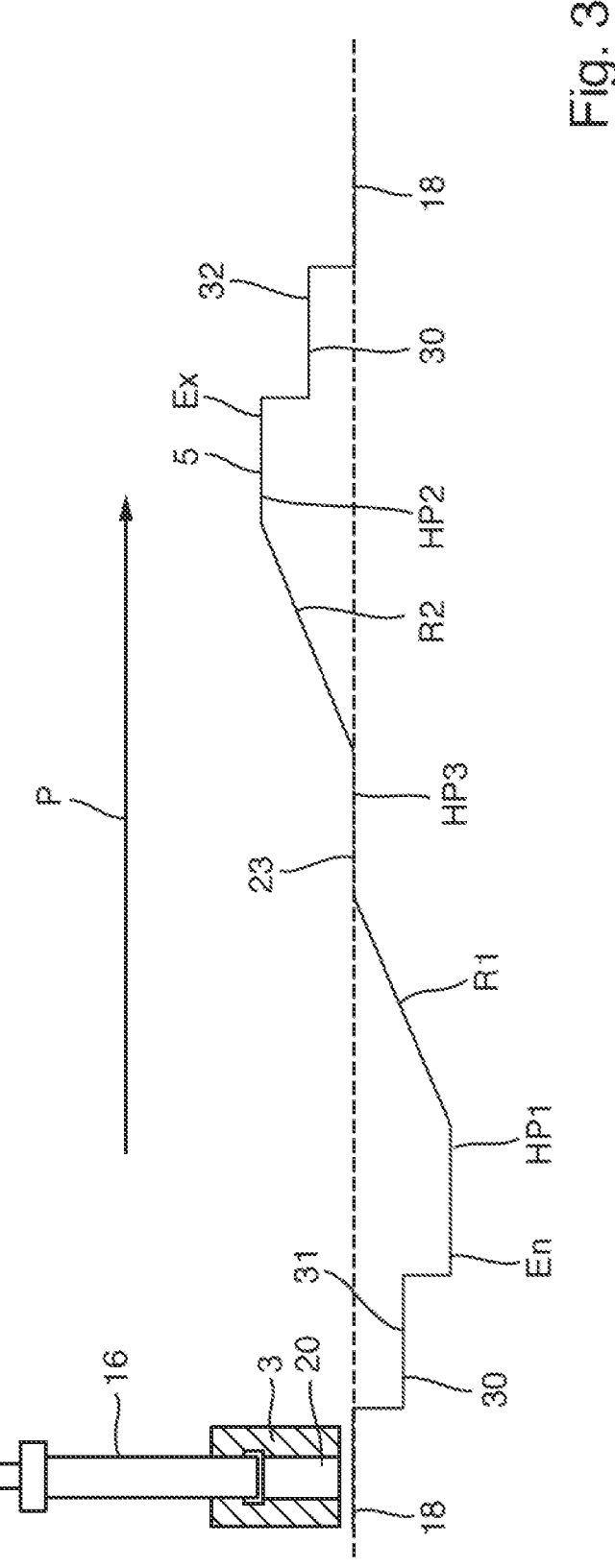
FIG. 3 schematically depicts a height progression of the driving surface along a circular path.

The height profile of the driving surface 5 is further shown in FIG. 3. A sample container carrier 3 comprising a sample container 16 is at first transported along the transport plane 18. Before entering on the driving surface 5, it first passes the entry surface 31 of the seal 30, which is slightly below the transport plane 18. Afterwards, it enters the entry position En of the driving surface 5 and moves on the first horizontal part HP1. It then ascends the first ascending ramp R1 towards the hand-over position 23 with its third horizontal part HP3. There, a sample container 16 can be removed or can be inserted. Afterwards, if further moves along the second ascending ramp R2 towards the second horizontal part HP2 at the exit position Ex. Then it moves downwards to the exit surface 32 of the seal 30 and furthermore moves downwards to the transport plane 18, where it may be transported to another entity along the transport plane 18.

By means of this configuration, it is ensured that the sample container carrier 3 moves either horizontally or along a smoothly ascending ramp, or along a step downwards. There is no ascending step along the path of transport of the sample container carrier 3, which could pose a risk of tilting the sample container carrier 3.

What is claimed is:

1. A laboratory sample container carrier handling apparatus comprising:
   a revolving device that moves a sample container carrier supplied thereto along a segment of a circular path; and
   a driving surface without an upward step, the driving surface extending between an entry position and an exit position, the driving surface comprising a first horizontal part immediately adjacent to the entry position, a second horizontal part immediately adjacent to the exit position and a third horizontal part all of which are horizontal along the circular path, wherein the third horizontal part is disposed between the first and second horizontal parts along the segment and defines a hand-over position, wherein the driving surface has a first ascending ramp that ascends from the first horizontal part to the hand-over position and a second ascending ramp that ascends from the hand-over position to the second horizontal part the driving surface cooperative with the revolving device to selectively insert, at the hand-over position, a sample container into the sample container carrier or release, at the hand-over position, a sample container from the sample container carrier.

2. The laboratory sample container carrier handling apparatus according to claim 1, characterized in that the revolving device comprises a plurality of pushing cavities, each adapted to receive a corresponding sample container carrier to be rotated and push the corresponding sample container carrier being received along the segment.

3. The laboratory sample container carrier handling apparatus according to claim 2, characterized in that at least one of the plurality of pushing cavities comprises two side walls, wherein the side walls rotate around an axis of rotation of the revolving device, wherein a side wall pushes the corresponding sample container carrier being in contact with the side wall along the segment.

4. A laboratory sample distribution system, wherein the laboratory sample distribution system comprises:

a plurality of sample container carriers, at least one of which is adapted to carry at least one sample container that contains at least one sample to be analyzed;

a transport plane, wherein the transport plane is adapted to support the plurality of sample container carriers;

drive means are adapted to move the plurality of sample container carriers on top of the transport plane; and a laboratory sample container carrier handling apparatus according to claim 1.

5. The laboratory sample distribution system according to claim 4, characterized in that the transport plane is arranged adjacent to the driving surface, wherein the drive means are adapted to supply the plurality of sample container carriers to the revolving device and are adapted to receive the plurality of sample container carriers from the revolving device.

6. The laboratory sample distribution system according to claim 4, characterized in that a seal is provided between the transport plane and the driving surface.

7. The laboratory sample distribution system according to claim 6, characterized in that the seal has at least one of:

an entry surface positioned between the transport plane and the entry position, the entry surface having a height between the height of the transport plane and the height of the driving surface at the entry position; or an exit surface positioned between the transport plane and the exit position, the exit surface having a height between the height of the transport plane and the height of the driving surface at the exit position.

8. The laboratory sample distribution system according to claim 4, characterized in that the plurality of sample container carriers each comprising at least one magnetically active device, and the drive means comprises a number of electro-magnetic actuators being stationary arranged in rows and columns below the transport plane, the electro-magnetic actuators being adapted to apply a magnetic force to the each of the plurality of sample container carriers.

9. The laboratory sample distribution system according to claim 8, wherein the at least one magnetically active device comprises at least one permanent magnet.

10. The laboratory sample distribution system according to claim 4, characterized in that the laboratory sample distribution system further comprises a gripping device being adapted to insert a sample container into at least one of the plurality of sample container carriers being positioned at the hand-over position as well as remove a sample container from at least one of the plurality of sample container carriers being positioned at the hand-over position.

11. The laboratory sample distribution system according to claim 4, characterized in that the driving surface has at least one of: at the entry position, a height being in a range between 0.3 mm and 0.5 mm below the transport plane; or at the exit position, a height being in a range between 0.3 mm and 0.5 mm above the transport plane.

* * * * *